United States Patent
Hashimoto

(10) Patent No.: US 10,368,314 B2
(45) Date of Patent: Jul. 30, 2019

(54) WIRELESS CONTROL SYSTEM

(71) Applicant: Mitsubishi Electric Corporation, Tokyo (JP)

(72) Inventor: Kentaro Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/778,373

(22) PCT Filed: Feb. 19, 2016

(86) PCT No.: PCT/JP2016/054946
§ 371 (c)(1),
(2) Date: May 23, 2018

(87) PCT Pub. No.: WO2017/141441
PCT Pub. Date: Aug. 24, 2017

(65) Prior Publication Data
US 2018/0359702 A1    Dec. 13, 2018

(51) Int. Cl.
*H04W 52/02*    (2009.01)
*H04W 92/08*    (2009.01)

(52) U.S. Cl.
CPC ......... *H04W 52/028* (2013.01); *H04W 52/02* (2013.01); *H04W 52/0258* (2013.01);
(Continued)

(58) Field of Classification Search
CPC combination set(s) only.
See application file for complete search history.

(56) References Cited

U.S. PATENT DOCUMENTS

2007/0081474 A1\*  4/2007  Sasaki ............... H04W 40/246
                                                        370/254
2010/0057233 A1   3/2010  Suzuki
(Continued)

FOREIGN PATENT DOCUMENTS

EP    2 330 750 A1    6/2011
JP    2001-333026 A   11/2001
(Continued)

OTHER PUBLICATIONS

Morimoto, Mitsuya, JP-2011066784-A Translation, Mar. 2011 (Year: 2011).\*
(Continued)

*Primary Examiner* — Yuwen Pan
*Assistant Examiner* — Erica L Fleming-Hall
(74) *Attorney, Agent, or Firm* — Posz Law Group, PLC

(57) ABSTRACT

The wireless control system includes a wireless adapter and a household electrical appliance. The wireless adapter includes a wireless module transmitting/receiving wireless signal, a wireless control unit analyzing and converting the wireless signal and controlling the wireless adapter, and a wireless display unit displaying wireless communication state by the wireless signal. The household electrical appliance includes an appliance control unit communicating with the wireless adapter and controlling the household electrical appliance, an appliance storage unit storing wireless setting and wireless state of the wireless communication, an appliance display unit displaying stored content of the appliance storage unit, and an appliance operation unit receiving request for the wireless setting from user by a user operation, and the appliance control unit controls power consumption of the wireless module and the wireless display unit based on the wireless setting stored in the appliance storage unit from startup time of the wireless adapter.

6 Claims, 6 Drawing Sheets

(52) U.S. Cl.
CPC .......... *H04W 92/08* (2013.01); *H04W 52/027* (2013.01); *Y02D 70/00* (2018.01); *Y02D 70/142* (2018.01)

(56) References Cited

U.S. PATENT DOCUMENTS

| | | | |
|---|---|---|---|
| 2013/0168038 A1* | 7/2013 | Ishizaka | F28F 27/00 165/11.1 |
| 2013/0289778 A1* | 10/2013 | Ishizaka | G05D 23/1905 700/276 |
| 2014/0222234 A1 | 8/2014 | Hirayama | |
| 2014/0250183 A1* | 9/2014 | Unagami | H04M 3/5166 709/204 |
| 2014/0253301 A1* | 9/2014 | Hirayama | G08C 17/02 340/12.54 |
| 2015/0074569 A1* | 3/2015 | Hirayama | F24F 11/30 715/765 |
| 2016/0061470 A1* | 3/2016 | Nagamine | G08C 17/02 700/276 |
| 2016/0179340 A1* | 6/2016 | Ogawa | G08C 17/02 715/736 |
| 2016/0218884 A1* | 7/2016 | Ebrom | D06F 33/02 |
| 2017/0010014 A1* | 1/2017 | Miyata | G05B 15/02 |
| 2017/0038087 A1* | 2/2017 | Nabeshima | G05B 15/02 |
| 2017/0272697 A1* | 9/2017 | Moses | H04N 7/147 |
| 2017/0307246 A1* | 10/2017 | Ohara | F24F 11/89 |
| 2018/0034652 A1* | 2/2018 | Okazaki | H04L 12/189 |
| 2018/0045424 A1* | 2/2018 | Yajima | F24F 11/89 |

FOREIGN PATENT DOCUMENTS

| | | | |
|---|---|---|---|
| JP | 2006-220405 | A | 8/2006 |
| JP | 2006220405 | A * | 8/2006 |
| JP | 2007-104536 | A | 4/2007 |
| JP | 2011-066784 | A | 3/2011 |
| JP | 2011066784 | A * | 3/2011 |
| JP | 2015-010769 | A | 1/2015 |
| JP | 2015-121392 | A | 7/2015 |
| JP | 2015-144627 | A | 8/2015 |

OTHER PUBLICATIONS

Murakami, Yasutaka, JP-2006220405-A Translation, Aug. 2006 (Year: 2006).*
International Search Report of the International Searching Authority dated May 10, 2016 for the corresponding international application No. PCT/JP2016/054946 (and English translation).
Extended EP Search Report dated Dec. 4, 2018 issued in corresponding EP application No. 16890582.6.
Office action dated Dec. 3, 2018 issued in corresponding Australian patent application No. 2016393002.

* cited by examiner

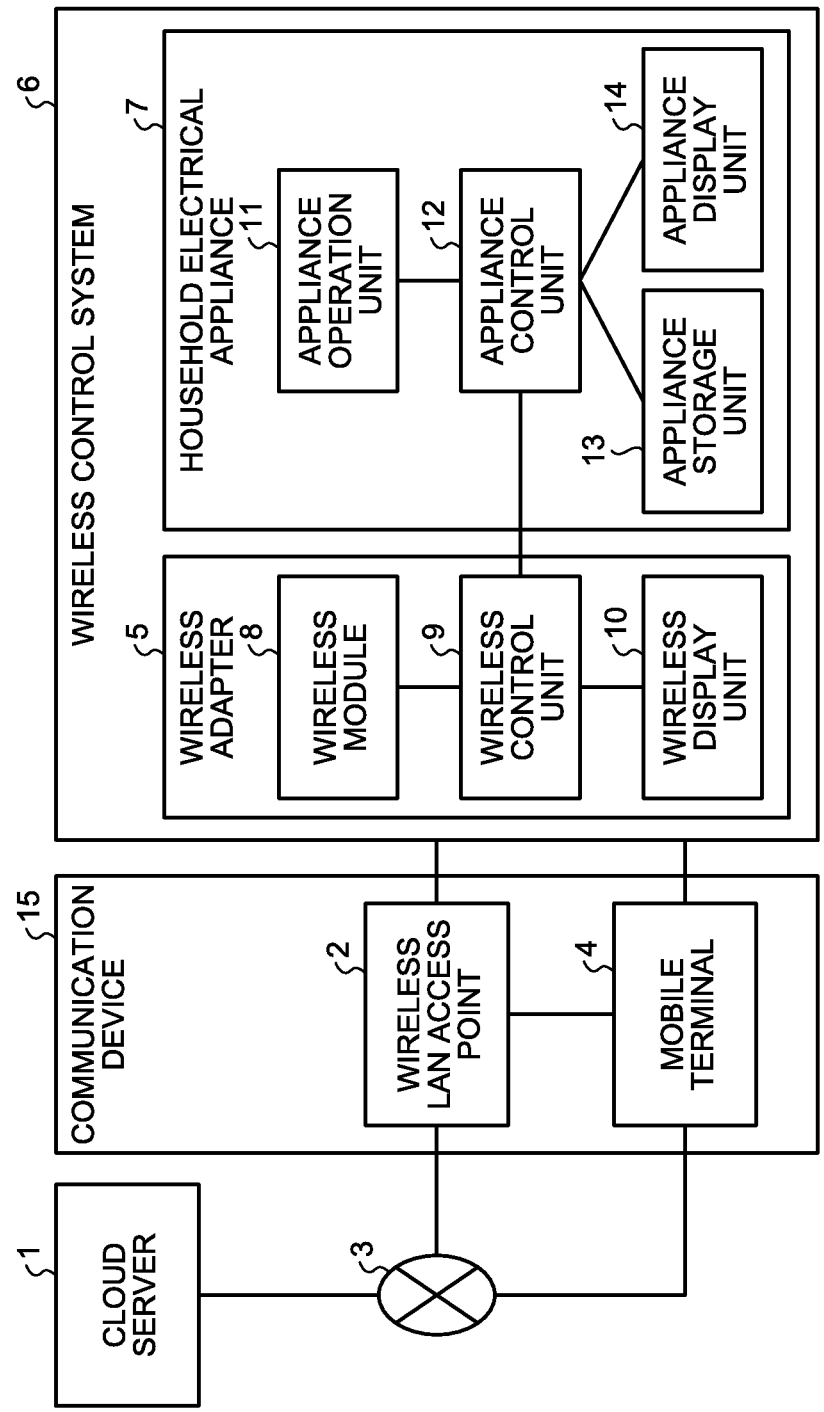

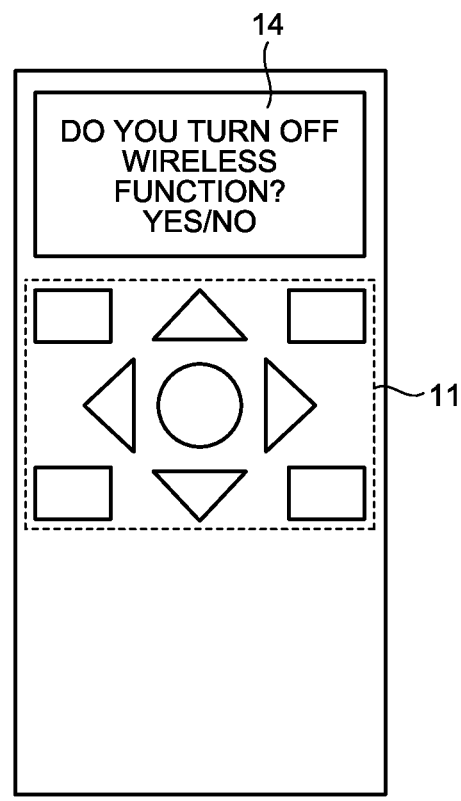

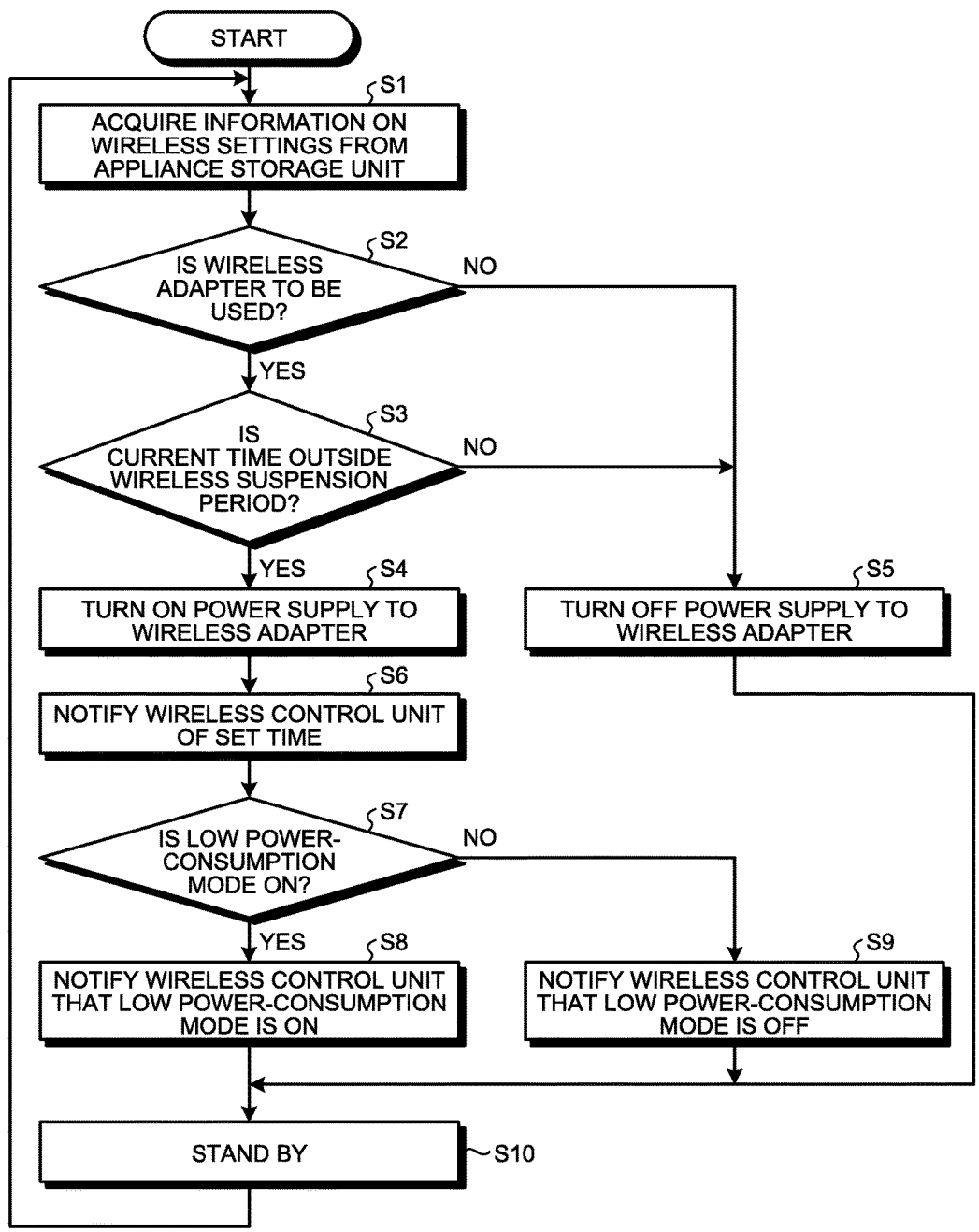

WIRELESS CONTROL SYSTEM

CROSS REFERENCE TO RELATED APPLICATION

This application is a U.S. national stage application of International Patent Application No. PCT/JP2016/054946 filed on Feb. 19, 2016, the disclosure of which is incorporated herein by reference.

TECHNICAL FIELD

The present invention relates to a wireless control system that performs wireless communication with a communication device.

BACKGROUND

There is a known conventional wireless control system that can disable or suppress a wireless communication function of a device that performs wireless communication. In such a wireless control system, power consumption is suppressed by stopping transmission of radio waves or by making transmission of radio waves less frequent.

Patent Literature 1 discloses an air conditioner that can operate in different modes under manual control and remote control and can reduce changes of its operation state unintended by a user. In a case where the remote control is not performed, power supply to a communication adapter is stopped to reduce unnecessary power consumption. The manual control and the remote control are switched by a user operation.

PATENT LITERATURE

Japanese Patent Application Laid-open No. 2015-10769

However, in the conventional technology described above, power supply to the communication adapter is stopped when in a mode in which wireless communication is not required in accordance with mode switching by a user operation. Therefore, depending on the user operation, a problem can occur in that, even in a case where wireless communication is not performed, power may still continue to be consumed in a configuration that achieves wireless communication.

SUMMARY

The present invention has been achieved in view of the above problems, and an object of the present invention is to provide a wireless control system that can reduce power consumption more than before.

To solve the problems described above, and to achieve the object described above, a wireless control system according to an aspect of the present invention performs wireless communication with a communication device and comprises a wireless adapter and a household electrical appliance. The wireless adapter includes a wireless module to transmit and receive a wireless signal, a wireless control unit to analyze and convert the wireless signal and to control the wireless adapter, and a wireless display unit to display a state of wireless communication by the wireless signal, the household electrical appliance includes an appliance control unit to communicate with the wireless adapter and to control the household electrical appliance, an appliance storage unit to store therein wireless setting and a wireless state of the wireless communication, an appliance display unit to display stored content of the appliance storage unit, and an appliance operation unit to receive a request for the wireless setting from a user, and the appliance control unit executes control such that power consumption of the wireless module and the wireless display unit is suppressed on a basis of the wireless setting stored in the appliance storage unit from a startup time of the wireless adapter.

The wireless control system according to the present invention has an effect where it is possible to reduce power consumption more than before.

BRIEF DESCRIPTION OF DRAWINGS

FIG. 1 is a diagram illustrating an exemplary configuration of a communication device that performs wireless communication with a wireless control system according to an embodiment.

FIG. 2 is a diagram illustrating an example of a remote controller that includes an appliance operation unit.

FIG. 3 is an explanatory diagram of wireless settings of the wireless control system illustrated in FIG. 1.

FIG. 4 is a flowchart illustrating an operation of an appliance control unit from startup to a steady-state operation.

DETAILED DESCRIPTION

Figure 5:
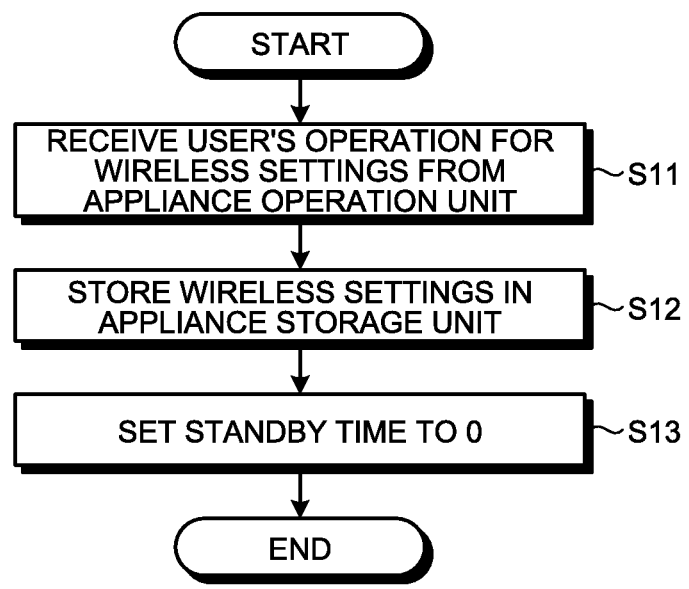
FIG. 5 is a flowchart illustrating an operation of the appliance control unit at the time of receiving a user operation.

A wireless control system according to an embodiment of the present invention will be described in detail below with reference to the accompanying drawings. The present invention is not limited to the embodiment.

Embodiment.

FIG. 1 is a diagram illustrating an exemplary configuration of a communication device that performs wireless communication with a wireless control system according to an embodiment of the present invention. A wireless control system 6 illustrated in FIG. 1 includes a wireless adapter 5 and a household electrical appliance 7, and performs wireless communication with a communication device 15. The wireless adapter 5 communicates with a wireless LAN access point 2 and a mobile terminal 4, which are the communication device 15. The wireless LAN access point 2 and the mobile terminal 4 are connected to the Internet 3. A cloud server 1 is connected to the Internet 3.

The wireless adapter 5 includes a wireless module 8, a wireless control unit 9, and a wireless display unit 10, and performs wireless communication. The wireless module 8 is a module that transmits and receives a wireless signal via radio waves to and from the wireless LAN access point 2 and the mobile terminal 4. The wireless control unit 9 is a control unit that analyzes and converts a wireless signal to be transmitted or received and controls the wireless adapter 5. The wireless display unit 10 is a display unit that displays a state of wireless communication. The wireless control unit 9 executes control such that transmission of radio waves by the wireless module 8 is suppressed and power consumption of the wireless display unit 10 is suppressed.

The household electrical appliance 7 includes an appliance operation unit 11, an appliance control unit 12, an appliance storage unit 13, and an appliance display unit 14. The appliance operation unit 11 is an operation unit that receives a request for, for example, wireless settings from a user. The appliance control unit 12 is a control unit that receives information from the appliance operation unit 11 and performs communication with the wireless adapter 5 to control the household electrical appliance 7. The appliance storage unit 13 is a storage unit that stores therein setting information such as wireless settings input to the appliance operation unit 11 and a wireless state, and includes a non-volatile memory. The appliance display unit 14 is a display unit that displays the stored content of the appliance storage unit 13. The appliance control unit 12 executes control such that power consumption of the wireless module 8 and the wireless display unit 10 is suppressed, on the basis of the wireless settings that are stored in the appliance storage unit 13 from a startup time of the wireless adapter 5.

Operation modes of the wireless module 8 include a slave mode that is referred to as a station mode and a master mode that is referred to as an access-point mode. In the station mode, communication is performed by using the wireless LAN access point 2 and the wireless module 8 as a master and a slave, respectively. In the access-point mode, communication is performed between the wireless module 8 and the mobile terminal 4 by using the wireless module 8 as a master.

Further, when there is the cloud server 1 as illustrated in FIG. 1, the mobile terminal 4 communicates with the cloud server 1 via the Internet 3, and the cloud server 1 communicates with the wireless adapter 5 via the Internet 3 and the wireless LAN access point 2.

FIG. 2 is a diagram illustrating an example of a remote controller that includes the appliance operation unit 11. The appliance operation unit 11 can change wireless settings by a user operation.

Although the appliance operation unit 11 and the appliance display unit 14 are provided in the remote controller of the household electrical appliance 7 in FIG. 2, the appliance operation unit 11 can be a switch provided on the body of the household electrical appliance 7 and is not limited to a specific form. Further, the appliance display unit 14 can be provided on the body of the household electrical appliance 7.

FIG. 3 is an explanatory diagram of wireless settings of the wireless control system 6 illustrated in FIG. 1. In the wireless settings illustrated in FIG. 3, ON/OFF of a wireless function, ON/OFF of a low power-consumption mode, a wireless suspension period, and set time used for determination of disconnection are set. The ON/OFF of the wireless function is a setting for controlling stop and start of power supply to the wireless adapter 5. The ON/OFF of the low power-consumption mode is a setting for reducing power consumption while the wireless function is maintained. The wireless suspension period is a set period during which the wireless function is suspended. The wireless suspension period can be regular in such a manner that the wireless function is suspended every Monday, for example, or can be a given period of time, and a plurality of periods can be set as the wireless suspension period.

Although the ON/OFF of the wireless function, the ON/OFF of the low power-consumption mode, and the wireless suspension period are illustrated in the wireless settings of FIG. 3, the present invention is not limited thereto. It is also possible to employ a configuration that only allows a part of these settings to be set.

The wireless settings illustrated in FIG. 3 are transferred to the appliance control unit 12 by the appliance operation unit 11, and the appliance control unit 12 causes the appliance storage unit 13 to store therein these wireless settings. In this manner, these wireless settings are stored in the appliance storage unit 13 and are displayed on the appliance display unit 14.

FIG. 4 is a flowchart illustrating an operation of the appliance control unit 12 from startup to a steady-state operation. First, the appliance control unit 12 is started to start a process, and the appliance control unit 12 acquires information on wireless settings from the appliance storage unit 13 (S1). The information on the wireless settings is the wireless settings illustrated in FIG. 3, and setting procedures of these wireless settings are described later with reference to FIG. 5.

The appliance control unit 12 refers to the acquired information on the wireless settings to determine whether to use the wireless adapter 5 (S2). In a case of using the wireless adapter 5 (YES at S2), that is, when the wireless function is ON, the appliance control unit 12 determines whether the current time is outside the wireless suspension period (S3). When the current time is outside the wireless suspension period (YES at S3), power supply to the wireless adapter 5 is turned on (S4). That is, power supply to the wireless adapter 5 is turned on only when the wireless function is ON (YES at S2) and the current time is outside the wireless suspension period (YES at S3). When the wireless function is OFF (NO at S2) or the current time is not outside the wireless suspension period (NO at S3), power supply to the wireless adapter 5 is turned off (S5).

After power supply to the wireless adapter 5 is turned on (S4), the appliance control unit 12 notifies the wireless control unit 9 of the set time used for determination of disconnection (S6). The appliance control unit 12 determines whether the low power-consumption mode is ON (S7). When the low power-consumption mode is ON (YES at S7), the appliance control unit 12 notifies the wireless control unit 9 that the low power-consumption mode is ON (S8), and when the low power-consumption mode is OFF (NO at S7), the appliance control unit 12 notifies the wireless control unit 9 that the low power-consumption mode is OFF (S9). After the notification indicating whether the low power-consumption mode is ON or OFF, a standby operation is performed (S10) and the process returns to S1. It is desirable that the standby time of the standby operation is equal to or less than the smallest unit of the wireless suspension period.

Although power supply to the wireless adapter 5 is turned off when the current time is within the wireless suspension period in FIG. 4, the present invention is not limited thereto. When the current time is within the wireless suspension period, the appliance control unit 12 may notify the wireless control unit 9 that the low power-consumption mode is ON so that an operation is performed in the low power-consumption mode (S8).

FIG. 5 is a flowchart illustrating an operation of the appliance control unit 12 at the time of receiving a user operation. After starting the process, when the appliance control unit 12 receives a user operation for wireless settings from the appliance operation unit 11 (S11), the appliance control unit 12 stores these wireless settings in the appliance storage unit 13 (S12). The appliance control unit 12 then sets the standby time of the standby operation to 0 (S13). Due to this operation of the appliance control unit 12, it is possible to immediately apply the wireless settings made by the user operation.

Although the standby time is set to 0 at S12 in FIG. 5, the present invention is not limited thereto. The operation for setting the standby time to 0 can be omitted by setting the standby time of the standby operation to be equal to or less than the smallest unit of the wireless suspension period as described above.

Figure 6:
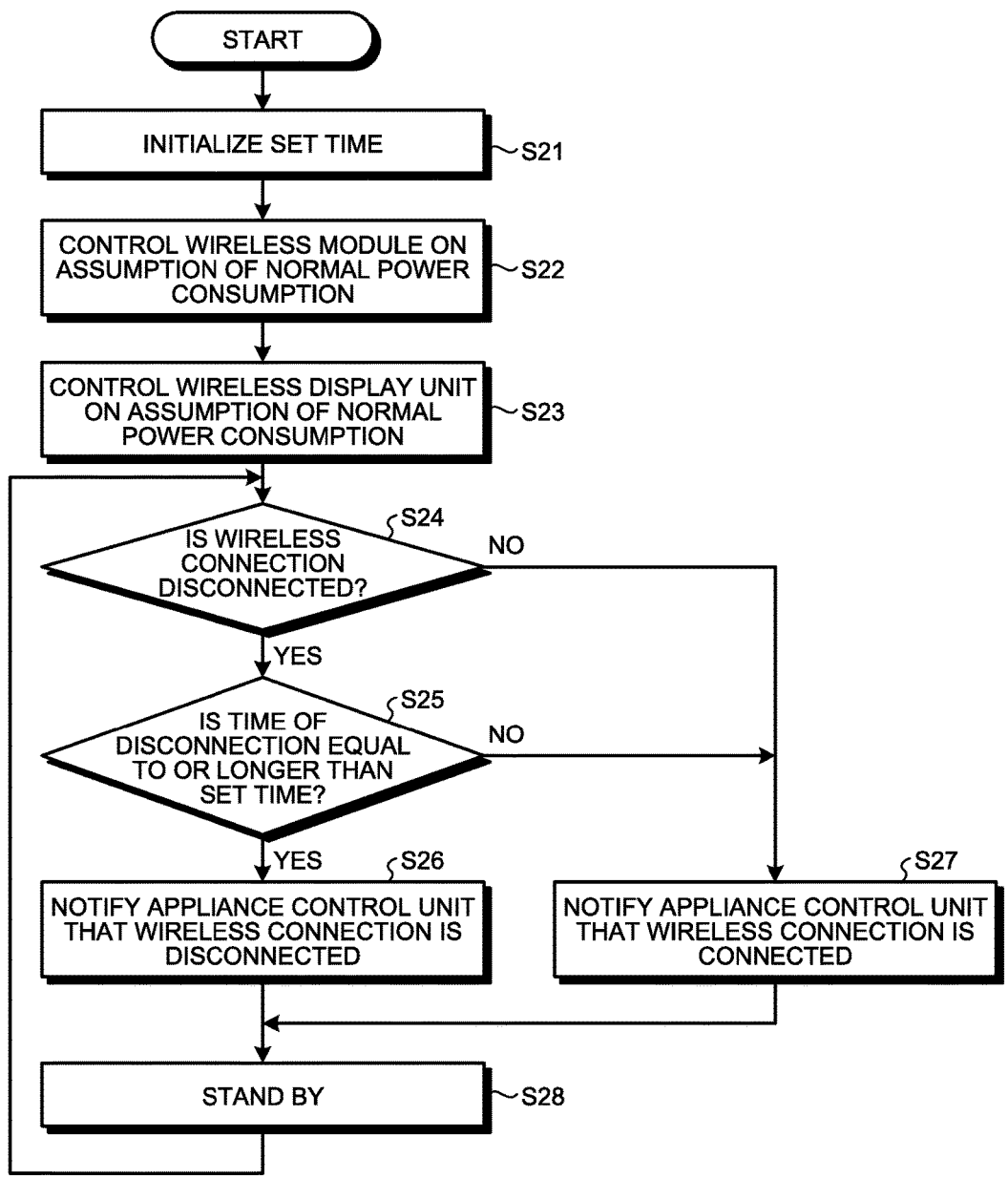
FIG. 6 is a flowchart illustrating an operation of a wireless control unit from startup to a steady-state operation.

FIG. 6 is a flowchart illustrating an operation of the wireless control unit 9 from startup to a steady-state operation. First, the wireless control unit 9 is started to start a process, and the wireless control unit 9 initializes the set time used for determination (S21). The wireless control unit 9 controls the wireless module 8 on the assumption of a normal power consumption (S22) and controls the wireless display unit 10 on the assumption of a normal power consumption (S23). Control on the assumption of a normal power consumption is control in a state where a control state in a low power-consumption mode is released.

The wireless control unit 9 then determines whether wireless connection of the wireless module 8 is disconnected (S24). When the wireless connection of the wireless module 8 is disconnected (YES at S24), the wireless control unit 9 determines whether the disconnection time is equal to or longer than the set time used for determination (S25). The disconnection time indicates the time during which the wireless connection is disconnected. That is, the wireless control unit 9 determines whether the wireless connection is disconnected for a time period equal to or longer than the set time. When the disconnection time is equal to or longer than the set time used for determination (YES at S25), the wireless control unit 9 notifies the appliance control unit 12 that the wireless connection is disconnected (S26). When the wireless connection of the wireless module 8 is not disconnected (NO at S24) or when the wireless connection is disconnected but the disconnection time is shorter than the set time used for determination (NO at S25), the wireless control unit 9 notifies the appliance control unit 12 that the wireless connection is connected (S27). The set time used for determination can be changed by a user. After the notification indicating whether the wireless connection of the wireless module 8 is disconnected or connected, the standby operation is performed (S28) and the process returns to S24.

In FIG. 6, when the disconnection time of the wireless connection of the wireless module 8 is equal to or longer than the set time used for determination, the wireless control unit 9 notifies the appliance control unit 12 that the wireless connection is disconnected; however, the present invention is not limited thereto. It is also possible to employ a configuration in which the wireless control unit 9 notifies the appliance control unit 12 that the wireless connection is disconnected in a case when communication that is required for the wireless control system 6 is not performed for a time period equal to or longer than the set time used for determination.

Figure 7:
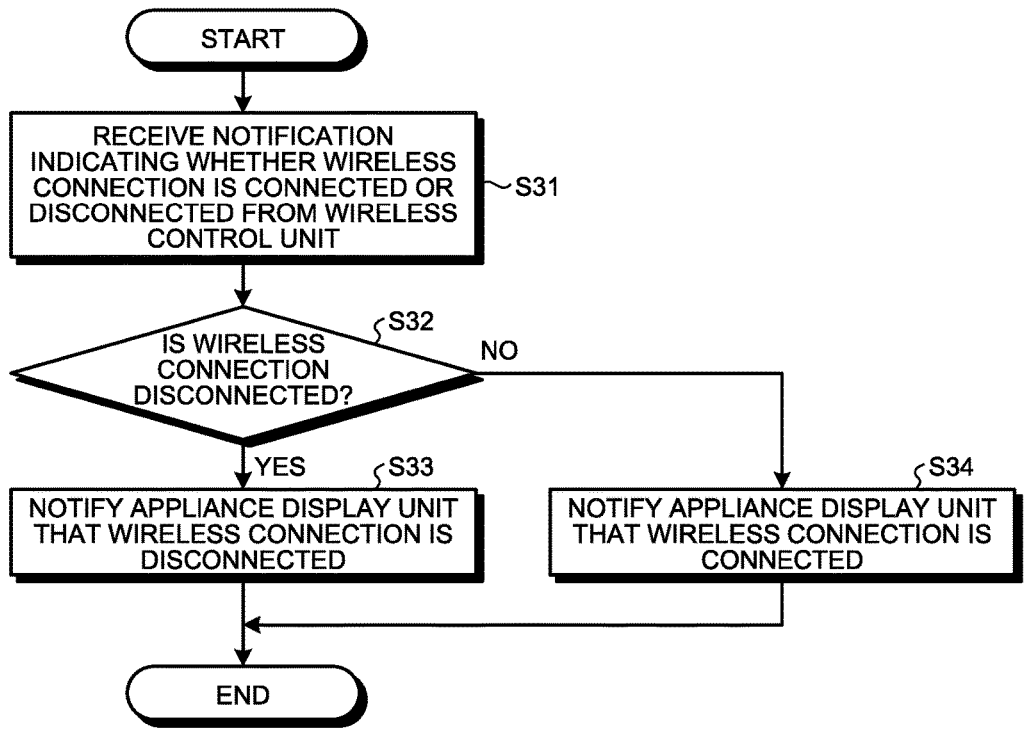
FIG. 7 is a flowchart illustrating an operation of the appliance control unit in response to a notification from the wireless control unit.

FIG. 7 is a flowchart illustrating an operation of the appliance control unit 12 in response to the notification from the wireless control unit 9. After starting the process, when the appliance control unit 12 receives a notification indicating whether the wireless connection is connected or disconnected, that is, a notification of a status of usage of wireless connection, from the wireless control unit 9 (S31), the appliance control unit 12 determines whether the received notification indicates disconnection of wireless connection (S32). When the received notification indicates disconnection (YES at S32), the appliance control unit 12 notifies the appliance display unit 14 that the wireless connection is disconnected (S33), and when the received notification indicates connection (NO at S32), the appliance control unit 12 notifies the appliance display unit 14 that the wireless connection is connected (S34).

The appliance display unit 14 that has received the notification that the wireless connection is disconnected or the notification that the wireless connection is connected as described above displays the status of usage of the wireless connection from the appliance control unit 12. As an example, as illustrated in FIG. 2, the appliance display unit 14 displays a message for prompting a user to select whether to turn off a wireless function. With this display, it is possible to make a user recognize that the wireless connection is not functioning normally, and when the wireless connection is not required, the user can turn off the wireless connection.

However, the present invention is not limited thereto, and it is possible to have a configuration that displays a message indicating that wireless settings need to be changed because the wireless connection is not functioning for a time period equal to or longer than the set time used for determination.

Figure 8:
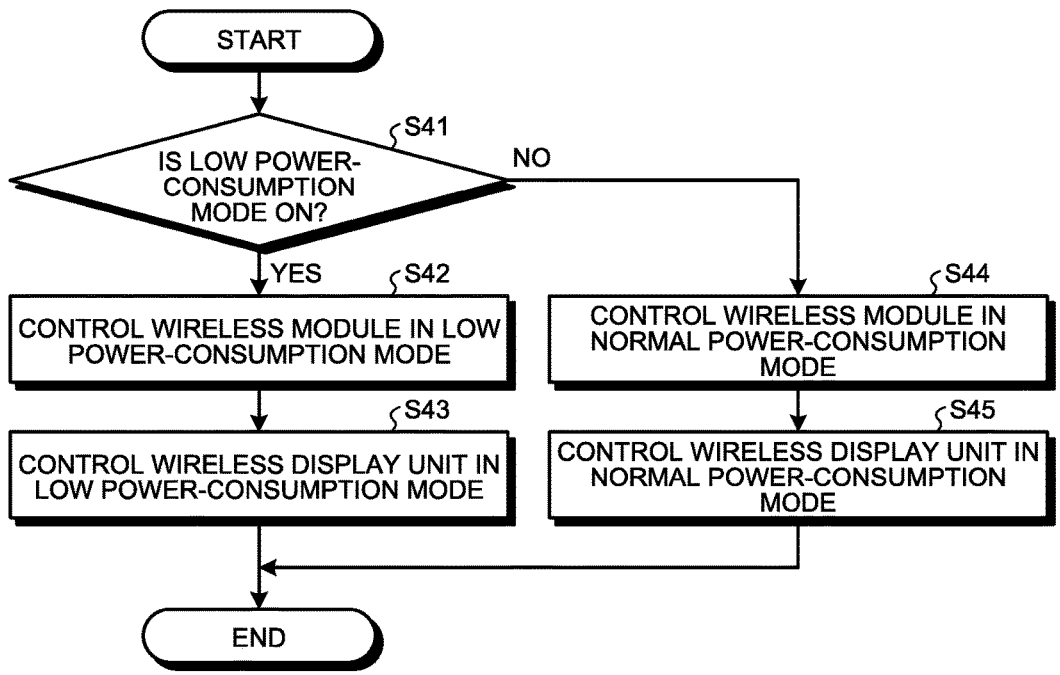
FIG. 8 is a flowchart illustrating an operation of the wireless control unit in response to a notification of a low power-consumption mode from the appliance control unit.

FIG. 8 is a flowchart illustrating an operation of the wireless control unit 9 in response to the notification of the low power-consumption mode from the appliance control unit 12. First, the wireless control unit 9 starts a process. When the notification of the low power-consumption mode indicates turning on of the low power-consumption mode (YES at S41), the wireless control unit 9 controls the wireless module 8 in the low power-consumption mode (S42) and also controls the wireless display unit 10 in the low power-consumption mode (S43). Examples of control that places the wireless module 8 in the low power-consumption mode include control that lowers the radio-wave transmission level and control that makes transmission of radio waves less frequent. Further, examples of control that places the wireless display unit 10 in the low power-consumption mode include control that lowers the brightness of the wireless display unit 10. When the notification of the low power-consumption mode indicates turning off of the low power-consumption mode (NO at S41), the wireless control unit 9 controls the wireless module 8 in a normal power-consumption mode (S44) and also controls the wireless display unit 10 in the normal power-consumption mode (S45).

The configuration described in the present embodiment is an example, and the present invention is not limited thereto. It is also possible that the cloud server 1 is not connected to the Internet 3 illustrated in FIG. 1. The mode of the appliance operation unit 11 included in the household electrical appliance 7 is not limited to the configuration illustrated in FIG. 2.

Conventional technologies assume a user who does not require wireless connection or a user who does not want wireless connection to be performed, determine an operation mode in accordance with the user operation, and stop power supply for wireless communication when wireless communication is not required in accordance with this operation mode. Therefore, depending on the user operation, a problem occurs in that even when wireless communication is not performed, there is a case where a wireless communication enabled state is maintained and thus power for the wireless communication is consumed. According to the present embodiment, an operation is performed on the basis of the stored wireless settings; therefore, power consumption of a wireless module and a wireless display unit can be suppressed. Further, when wireless communication is not performed, a notification is issued so that it is possible to prompt a user to perform an operation of turning off wireless communication.

In addition, in conventional technologies, power supply for wireless communication is stopped in a case where wireless communication is not performed. Therefore, recovery of wireless communication cannot be achieved smoothly in some cases. By allowing an operation in a low power-consumption mode to be selected as described in the present embodiment, it is possible to achieve both improvement in user convenience and reduction in power consumption.

Further, by setting the time period during which wireless communication is not used as a suspension period, it is also possible to effectively suppress power consumption.

As described above, the wireless control system described in the present embodiment can reduce power consumption more than before.

Although a wireless control system that includes a wireless adapter and a household electrical appliance has been described in the present embodiment, the device included in the wireless control system is not limited to a household electrical appliance.

The configurations described in the above embodiment are only examples of the content of the present invention. The configurations can be combined with other well-known techniques, and a part of each of the configurations can be omitted or modified without departing from the scope of the present invention.

The invention claimed is:

1. A wireless control system that performs wireless communication with a communication device and comprises:
   a wireless adapter; and
   a household electrical appliance, wherein
   the wireless adapter includes
      a wireless module to transmit and receive a wireless signal,
      a wireless controller, and
      a wireless display,
   the wireless controller is configured to
      analyze and convert the wireless signal received via the wireless module,
      control the wireless adapter,
      display, on the wireless display, a connected/disconnected state of wireless communication by the wireless signal, and
      notify the household electrical appliance of the connected/disconnected state of the wireless communication,
   the household electrical appliance includes
      an appliance operator configured to receive a request for a wireless setting from a user,
      an appliance controller configured to communicate with the wireless adapter and to control the household electrical appliance,
      an appliance storage, and
      an appliance display,
   the appliance controller is configured to
      receive, via the appliance operator, the request for the wireless setting from the user,
      cause the appliance storage to store the wireless setting of the wireless communication received via the appliance operator,
      display, on the appliance display, the wireless setting of the wireless communication from the appliance storage and the connected/disconnected state of the wireless communication notified by the wireless adapter, and
      control power supply to the wireless module and the wireless display on a basis of the wireless setting stored in the appliance storage from a startup time of the wireless adapter so as to suppress power consumption of the wireless module and the wireless display.

2. The wireless control system according to claim 1, wherein the wireless controller is further configured to suppress transmission of radio waves of the wireless module and power consumption of the wireless display.

3. The wireless control system according to claim 1, wherein the appliance controller is further configured to receive a notification of a status of usage of wireless connection from the wireless controller, and issue a notification to the appliance display in accordance with the status of usage.

4. The wireless control system according to claim 1, wherein the appliance controller is further configured to cause the appliance display to display a status of usage of wireless connection received from the appliance controller.

5. The wireless control system according to claim 1, wherein
   the appliance controller is further configured to control power supply to the wireless adapter on a basis of the wireless setting stored in the appliance storage, and notify the wireless controller of ON/OFF of a low power-consumption mode.

6. The wireless control system according to claim 1, wherein
   the appliance controller is further configured to transmit a notification to the wireless controller to suppress power consumption, and
   the wireless controller is further configured to, responsive to receiving the notification to suppress power consumption, place the wireless module in a low power-consumption mode in which the wireless module is powered on and reduces a transmission level or transmission frequency of the wireless signal which is transmitted.

* * * * *